United States Patent

[11] 3,607,662

| [72] | Inventor | John A. Glover |
| | | Wicker Estates, Munster, Ind. |
| [21] | Appl. No. | 751,296 |
| [22] | Filed | Aug. 8, 1968 |
| [45] | Patented | Sept. 21, 1971 |
| [73] | Assignee | Sinclair Oil Corporation |

[54] FRACTIONAL DISTILLATION APPARATUS HAVING VAPOR FLOW CONTROL MEANS FOR ALTERNATE CONDENSERS
10 Claims, 1 Drawing Fig.

[52] U.S. Cl. ................................................ 202/160,
202/161, 202/186, 202/191, 202/205, 203/2,
203/87, 203/DIG. 2, 203/DIG. 18
[51] Int. Cl. .................................................. B01d 3/42,
F28b 11/00
[50] Field of Search .................................... 202/186,
161, 158, 199, 198, 190, 191, 160, 205, 81; 203/2,
87, 91

[56] References Cited
UNITED STATES PATENTS

| 2,573,807 | 11/1951 | Piros et al. ..................... | 202/161 |
| 2,701,789 | 2/1955 | White ............................ | 202/161 |
| 2,764,534 | 9/1956 | Nerheim ......................... | 202/161 |
| 3,103,471 | 9/1963 | Asami ........................... | 202/190 |
| 3,219,551 | 11/1965 | Carel et al. .................... | 202/161 |
| 3,416,999 | 12/1968 | Shepherd et al. ................. | 202/161 |

FOREIGN PATENTS

| 581,988 | 8/1959 | Canada ........................ | 202/161 |

Primary Examiner—Wilbur L. Bascomb, Jr.
Attorneys—Morton, Bernard, Roberts, Brown & Sutherland, John W. Behringer and James N. Dresser ABSTRACT: A laboratory distillation apparatus suitable for operation over wide temperature and pressure ranges to permit distillation of materials regardless of their state at room temperature. A vapor from the charge passes through a distillation column containing a packing material and then enters an overhead fractionating condenser. The condensate drops onto the packing, and contact rectification causes more complete separation of the vapor components. When an equilibrium condition is reached, the input to the fractionating condenser is closed and an input is opened to an overhead receiving condenser. The vapor then condenses and passes to a receiver. A temperature-control fluid surrounds the two condensers to insure that the material in them remains in the liquid state. Connections are provided for a vacuum pump to permit operation under reduced pressure.

PATENTED SEP 21 1971 3,607,662
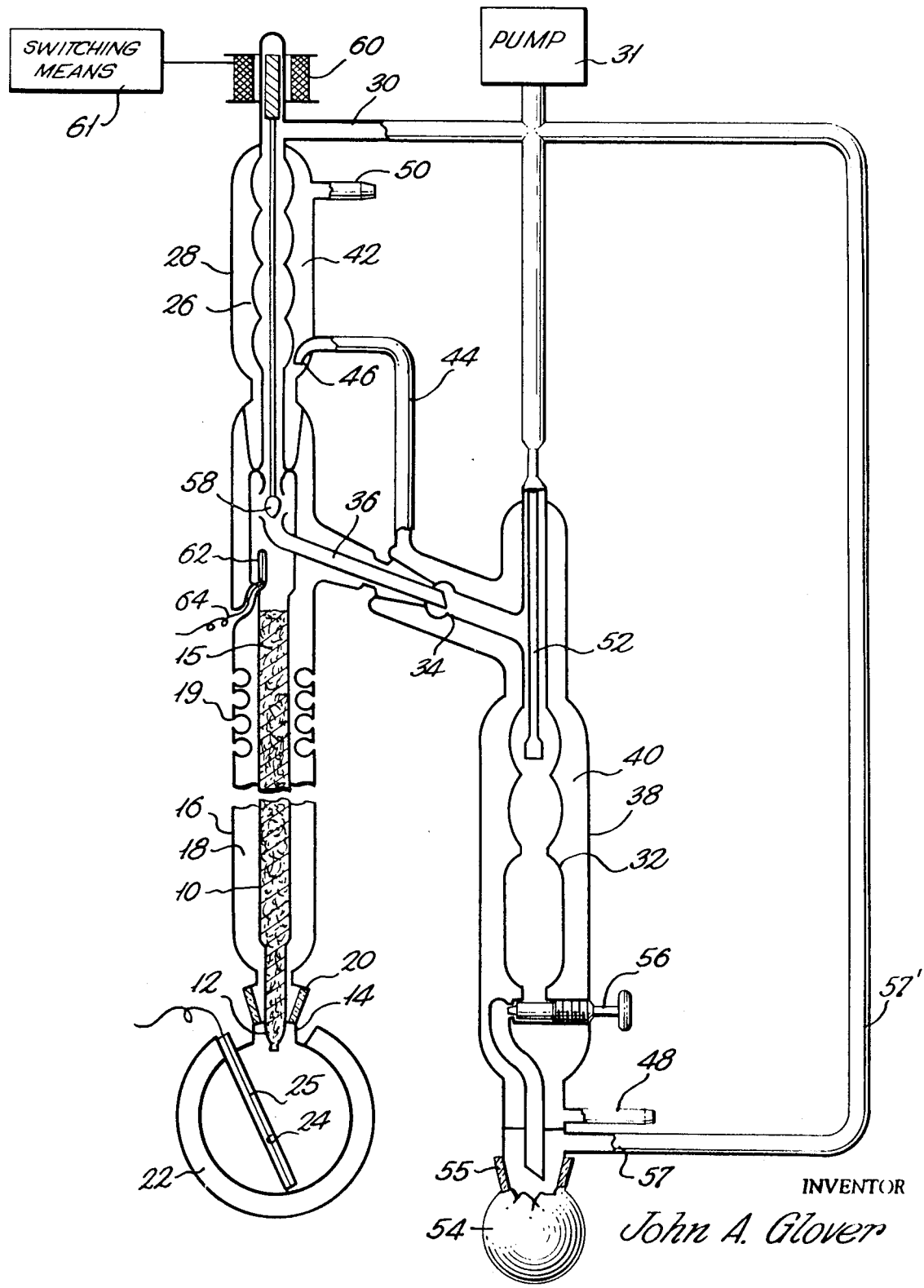
INVENTOR
John A. Glover
BY
McLean, Morton & Boustead
ATTORNEYS

FRACTIONAL DISTILLATION APPARATUS HAVING VAPOR FLOW CONTROL MEANS FOR ALTERNATE CONDENSERS

The present invention pertains to a laboratory distillation apparatus. More particularly the present invention pertains to laboratory distillation apparatus for fractional distillation of a material in which first and second condensers are provided to accommodate fractionating condensation and receiving condensation, respectively, and in which the temperatures of the two condensers are controlled to insure that the material therein remains in a liquid state.

Numerous laboratory processes require the distillation of a material. The material to be distilled, referred to as the sample or charge, might be a solid, a liquid or a gas at room temperature. The distillation process to be followed depends to some extent upon the state of the charge at room temperatures. If the charge is a solid at room temperature, then it must be heated to a high level to drive off a vapor, and the vapor must be cooled to obtain a liquid condensate. The cooling must be limited to a critical range, however, to insure that the material does not return to the solid state and block the distillation apparatus. Thus, the cooling temperature must be controlled by a control medium warmer than room temperature but cooler than the temperature to which the charge is heated. The temperature to which the solid charge must be heated can be reduced by operating the distillation apparatus under reduced pressure.

If the charge is a liquid at room temperature, then it must be heated to cause vaporization, and again it must be cooled to cause condensation. Since the material is liquid at room temperature, the cooling can be permitted to reach room temperature without risk of harm to the distillation apparatus. If the charge is a gas at room temperature, it must first be cooled to provide a liquid sample, then it must be permitted to slowly increase in temperature, thereby driving off a vapor. This vapor must again be cooled if a liquid product is required. The amount of cooling required depends upon the boiling point of the material.

Heretofore independent distillation apparatus have been required for use in distillation processes involving materials having different states at room temperature. With prior art apparatus, if distillation of solid material is desired, it is necessary to utilize distillation apparatus which permits heating of the charge to a high level and which maintains the condensate at a moderate temperature to insure that it remains in the liquid state. If the sample is a gas at room temperature, then the distillation apparatus is required to provide cooling of the sample and of the product. Distillation of material in a liquid state at room temperature requires distillation apparatus capable of heating the charge and perhaps capable of cooling the product. As a consequence, a wide variety of distillation apparatus have been required in the laboratory, heretofore. To expedite operations and to cut down on the amount of equipment in the laboratory, it frequently has been attempted to get by with less than the necessary equipment and to utilize makeshift apparatus put together from whatever equipment has been available. As a consequence, heretofore the laboratory personnel have been required to spend much time improvising the necessary equipment.

The present invention is a laboratory distillation apparatus comprising a packed fractionating column communicatively coupled to a conduit leading to an overhead receiving condenser. In addition, the column is communicatively coupled to the input of an overhead fractionating condenser. A solenoid-operated valve alternates between a first position, in which it blocks the conduit to cause the vapors to pass into the fractionating condenser, and a second position, in which it blocks the input of the fractionating condenser to cause the vapors to pass into the receiving condenser. Jackets surround each condenser, thereby forming temperature-control zones around each condenser. A temperature-control fluid is passed through the temperature-control zones to insure that the distillation operation takes place at the desired critical temperature. A vacuum pump can be coupled to the apparatus to permit operation under reduced pressure. Thus, distillation can be accomplished within critical temperature and pressure ranges.

These and other aspects and advantages of the present invention are apparent in the following detailed description and claims, particularly when considered in conjunction with the accompanying drawing which is a diagrammatic view of the distillation apparatus of the present invention.

As depicted in the drawing, a fractionating column 10 has its first end 12 inserted into the interior of a container 14 which may be a standard distillation flask or pot. Column 10 is packed with a suitable packing 15, as is well known in the art. Column 10 is surrounded by a jacket 16 having a silvered surface. The zone 18 between column 10 and jacket 16 is evacuated to a low pressure in the vicinity of a complete vacuum to provide more uniform temperature control. Preferably, jacket 16 includes bellows 19 to permit expansion of the apparatus upon heating. To prevent contamination of the charge, junction 20 where column 10 communicates with the interior of pot 14 is tightly sealed, for example, by a ground glass joint.

A temperature-control device 22 surrounds pot 14 to control the temperature within pot 14 during the distillation process. For example, temperature-control device 22 may be an electrically controlled heating mantle if heat must be applied to the charge. If cooling is required, device 22 can be a container housing a mixture of dry ice and acetone, for example. Thermowell 24 is provided within pot 14 to permit connection of temperature-sensing means 25, which by way of example may be a thermocouple, so that the temperature within pot 14 can be monitored during the distillation process. Temperature-sensing means 25 is connected to temperature-monitoring equipment (not shown).

The upper end of fractionating column 10 is communicatively coupled to the interior of overhead fractionating condenser 26 which is surrounded by jacket 28. The upper end of fractionating condenser 26 terminates in outlet 30 which is coupled to a vacuum pump 31 to permit reduction of the pressure within fractionating condenser 26, fractionating column 10, and pot 14.

Overhead receiving condenser 32 has its input 34 coupled to the interior of vapor column 10 by means of conduit 36. The inlet end of conduit 36 is located within vapor column 10 in close proximity to the input of overhead fractionating condenser 26. Receiving condenser 32 is surrounded by jacket 38. Zone 40 between receiving condenser 32 and jacket 38 forms a receiving temperature-control zone. Similarly zone 42 between fractionating condenser 26 and jacket 28 forms a fractionating temperature-control zone.

Pipe 44 communicatively couples the receiving temperature-control means 38 to the fractionating temperature-control zone 42. Within the zone 42, pipe 44 terminates in a downwardly extending outlet 46. Temperature-control fluid is introduced to the temperature-control zone at inlet 48. The temperature-control fluid then flows through receiving temperature-control zone 40 and pipe 44 to fractionating temperature-control zone 42. Since outlet 46 extends downwardly, the temperature-control fluid is directed towards the junction of vapor column 10 and fractionating condenser 26 to insure that the temperature at that junction is maintained. The temperature-control fluid is then exhausted from fractionating temperature-control zone 42 at outlet 50.

Pressure-equalizing vent 52 extends into receiving condenser 32 and is connected to vacuum pump 31 so that the vacuum can be provided within the receiving condenser if desired.

The lower end of overhead receiving condenser 32 is communicatively coupled to the interior of receiver 54 via a ground glass joint. Receiver 54 might be a standard receiving flask, for example. The communicating coupling between receiving condenser 32 and receiver 54 includes valve 56 which permits control of the condensate flow. Receiving temperature-control zone 40 extends to a point just above joint 55, and so valve 56 is within the temperature-control zone. Therefore, the condensate does not solidify on valve 56.

Outlet 57 from joint 55 is coupled to pump 31 via tube 57' so that when valve 56 closes the communicating path between condenser 32 and receiver 54, the pressure within receiver 54 can be reduced as desired. When it is desirable to remove the condensate from receiver 54, separate valves (not shown) in tube 57' permit receiver 54 to be returned to atmospheric pressure.

A valve 58 is located within fractionating column 10 between conduit 36 and the input of fractionating condenser 26. The exterior surfaces of both valves 56 and 58 are made of a noncorrosive material such as tetrafluoroethylene resin or fluorinated ethylene propylene resin (both of which are commercially available under the trademark Teflon) to permit distillation of corrosive materials. Valve 58 is controlled by solenoid 60, which may be mounted at the top of fractionating condenser 26, for example. Solenoid 60 is controlled by switching means 61 which may be an automatic timer, a manually operated switch, or another automatic-switching means, by way of examples.

Thermowell 62 extends upwardly into the side of vapor column 10, terminating at a point just beneath the junction of conduit 36 and vapor column 10. Thermocouple 64 is within thermowell 62 and is coupled to temperature-monitoring equipment (not shown). Thermowell 62 preferably extends upwardly so that condensation on the inner sidewalls of column 10 cannot collect on its tip.

When the distillation process is commenced, solenoid 60 is deenergized so that valve 58 is lowered by gravity to block conduit 36. If the charge within pot 14 is a solid at room temperature, heat is applied via heating mantle 22 through pot 14 to heat the charge. A temperature-control fluid is introduced through inlet 48 to circulate through temperature-control zones 40 and 42 before passing through outlet 50. If it is desired to operate the apparatus under a reduced pressure, then outlets 30 and 57 and equalizing vent 52 are connected to pump 31 which reduces the pressure within the system. The temperature-control zones 40 and 42 and the pressure control via outlets 30 and 57 and equalizing vent 52 insure that the entire apparatus is at uniform temperature and pressure.

When the temperature of the charge reaches the level at which the most volatile ingredient thereof vaporizes, the vapor rises within fractionating column 10 and enters overhead fractionating condenser 26. The temperature-control fluid within zone 42 maintains the temperature of fractionating condenser 26 at a level low enough to cause the vapor to condense but high enough to prevent solidification. Such solidification would, of course, impede the operation of the system.

The vapor within condenser 26 condenses, and the condensate falls from condenser 26 back into column 10 where it impinges upon packing 15. The vapor rising through column 10 heats this condensate and again vaporizes it. This cycle of the vapor rising through column 10, condensing within overhead fractionating condenser 26, falling to impinge upon packing 15, revaporizing, reentering condenser 26, recondensing, and again returning to the packing 15 continues until the temperature measured by thermocouple 64 reaches equilibrium at a level high enough to maintain the material in a vaporized form at the upper end of column 10 where conduit 36 enters. Each time the condensate vaporizes, the resulting vapor has a high concentration of the more volatile constituents of the charge.

When the temperature at thermowell 62 stabilizes, solenoid 60 is energizes, raising valve 58 from its position in contact with conduit 36 and bringing it to its position in which it closes the input to overhead fractionating condenser 26. The vapor is then prevented from entering fractionating condenser 26. Instead the vapor passes through conduit 36 to enter overhead receiving condenser 32. The temperature-control fluid maintains the receiving temperature-control zone 40 at the same critical temperature as the fractionating temperature-control zone 42. Consequently the vapor again condenses within overhead receiving condenser 32. The condensate collects at the bottom of the condenser 32 until valve 56 is opened to permit the product to flow into receiver 54. If desired, switching means 61 which operates solenoid 60 can include a timer to permit automatic intermittent opening and closing of conduit 36 at a set ratio to enable control of the reflux ratio and the rate of condensate takeoff in a manner not affected by the skill of the operator.

The distillation apparatus of the present invention has been found to be extremely versatile in laboratory operations. For example, a crude mixture p-phenylene diisocyanate was distilled within the apparatus at a temperature of 123° C. and a pressure of 18 mm. mercury. Steam was used as the temperature-control fluid within zones 40 and 42. 497 grams of 100 percent pure distillate were obtained from an initial mixture of 570 grams. Although solid p-phenylene diisocyanate has a melting temperature of 93° C., no solidification was observed within the apparatus. Thus, the operation of the apparatus was in no way impeded.

As an example, a mixture of isoprene, having a boiling point of 34° C., and piperylene, with a boiling point of 43° C., was distilled. The circulating fluid used for temperature control was ice water maintained at a temperature in the range of 10° to 15° C. The distillation yielded 45 grams of a fraction boiling at 34.0° C., 6.5 grams of a fraction boiling between 34.0° and 36.0° C., and a pot residue of 16.5 grams, accounting for 100 percent of the charge. No trouble was experienced in containing these volatile materials.

Thus, it is seen that the apparatus is capable of distilling any material, regardless of the state of the material at room temperature, simply by properly selecting the temperature-control fluid utilized within temperature-control zones 40 and 42, by properly selecting the temperature-control device 22, and by controlling the pressure within the apparatus. If a particular application requires different temperatures within temperature-control zones 40 and 42, then pipe 44 is omitted, and the two temperature-control zones 40 and 42 are coupled to separate sources of temperature-control fluid. Since the entire apparatus is made of corrosion-resistant materials, highly corrosive samples can be distilled. The apparatus can, of course, be of whatever size best suits the particular requirements.

Although the above description has made reference to a preferred embodiment, obviously numerous changes in structure and components could be made without departing from the scope of the invention which is defined by the claims.

1. Apparatus for effecting distillation comprising
- a fractionating column having an inlet end for reception of vapor and an outlet end;
- a first condenser positioned above said fractionating column and including an input communicatively coupled to said fractionating column outlet end for reception of vapor therefrom and a jacket surrounding said first condenser to form a first condensation temperature-control zone;
- a second condenser including an inlet end, an outlet end for emission of a condensate, and a jacket surrounding said second condenser to form a second condensation temperature-control zone;
- conduit means communicatively coupling said second condenser inlet end to said fractionating column outlet end to permit vapor flow from said fractionating column into said second condenser;
- valve means and;
- valve-control means for operating said valve means between a first position in which said valve means blocks said first condenser input to prevent vapor flow therethrough while permitting vapor flow through said conduit means and a second position in which said valve means blocks said conduit means to prevent vapor flow therethrough while permitting vapor flow through said first condenser input.

2. Apparatus as claimed in claim 1 further comprising means for sensing the temperature of said fractionating column outlet end.

3. Apparatus as claimed in claim 1 in which said valve control means includes means for operating said valve in accordance with a predetermined time relationship.

4. Apparatus as claimed in claim 1 in which said fractionating column contains a packing material and is surrounded by a jacket defining a vacuum zone, said vacuum zone being evacuated to a low pressure in the vicinity of a complete vacuum.

5. Apparatus as claimed in claim 1 further including pressure-control means for controlling the pressure within said apparatus.

6. Apparatus as claimed in claim 5 in which said pressure-control means includes a pump communicatively coupled to said apparatus.

7. Apparatus as claimed in claim 1 further including:
   a. a first container having an interior for holding a charge to be distilled, said first container interior communicatively coupled to said fractionating column; and
   b. a second container having an interior for receiving said condensate, said second container interior communicatively coupled to said second condenser outlet end.

8. Apparatus as claimed in claim 7 further including means for controlling the temperature of said first container.

9. Apparatus as claimed in claim 8 further including means for sensing the temperature within said first container.

10. Apparatus as claimed in claim 9 in which said fractionating column contains a packing material and is surrounded by a vacuum-creating jacket.